Jan. 2, 1940.  G. S. SAWYER  2,185,572
WINDSHIELD WIPER
Filed Sept. 12, 1938
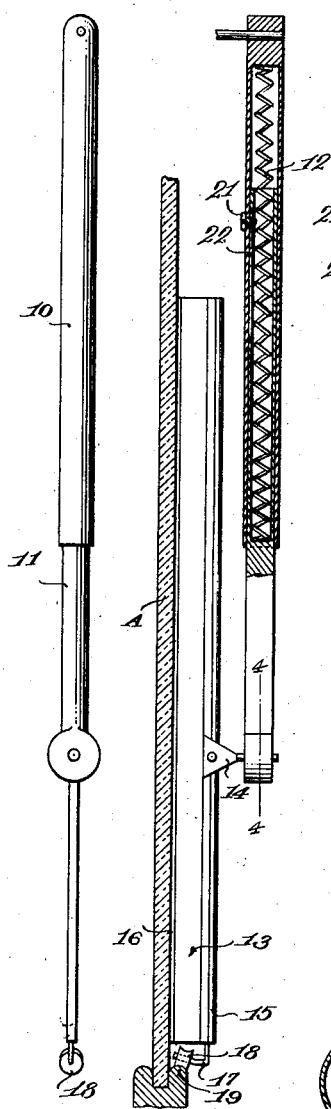
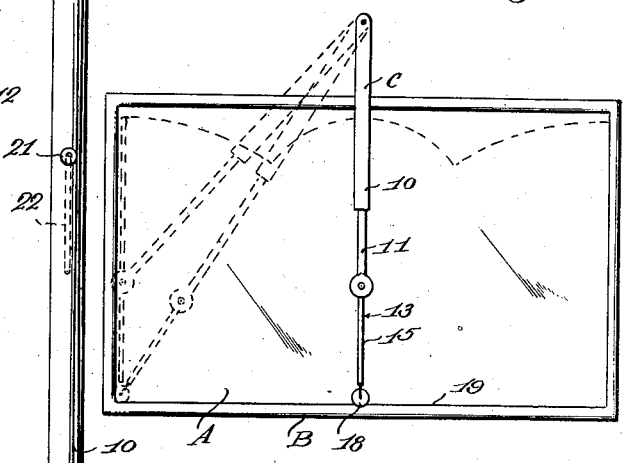
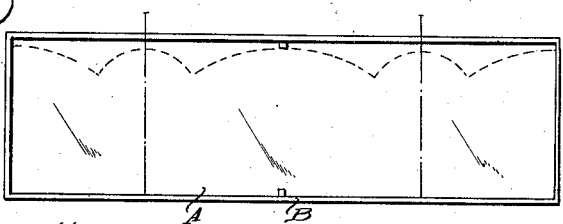
Guy. S. Sawyer
INVENTOR
BY Victor J. Evans & Co.
ATTORNEYS Patented Jan. 2, 1940

2,185,572

UNITED STATES PATENT OFFICE 2,185,572

WINDSHIELD WIPER

Guy S. Sawyer, San Antonio, Tex.

Application September 12, 1938, Serial No. 229,627

2 Claims. (Cl. 15—255)

The invention relates to a windshield wiper and more particularly to an extensible and contractible variable sweep windshield wiper.

The primary object of the invention is the provision of a wiper of this character, wherein its construction is such that when operating upon a windshield it will have a wide sweep thus clearing the glass or panel so as to assure maximum vision therethrough during inclement weather and operation of said wiper.

Another object of the invention is the provision of a wiper of this character, wherein through oscillation of the wiper arm the wiper blade will have contact with the glass or pane of the windshield and will travel over a major extent thereof thereby clearing the vision therethrough to a maximum extent, the wiper being of novel construction.

A further object of the invention is the provision of a wiper of this character, which is simple in its construction, thoroughly reliable and efficient in the operation, automatic in the working thereof, possessing but few parts yet strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is an elevation of the wiper constructed in accordance with the invention.

Figure 2 is a fragmentary vertical sectional view through a windshield and its glass showing the wiper in elevation and partly broken away associated therewith.

Figure 3 is a view looking toward the inner side of the wiper arm.

Figure 4 is a sectional view taken on the line 4—4 of Figure 2.

Figure 5 is an elevation showing several adjusted positions of the wiper, one position being by full lines and the others by dotted lines.

Figure 6 is a view similar to Figure 5 showing diagrammatically the results of operation of a pair of wipers constructed in accordance with the invention.

Similar reference characters indicate corresponding parts throughout the several views in the drawing.

Referring to the drawing in detail, particularly Figures 1 to 5, A designates generally the glass or transparent panel conventionally built into a windshield B for a motor vehicle while C denotes generally the windshield wiper constructed in accordance with the invention and hereinafter fully described.

The wiper C comprises tubular telescopically interfitted inner and outer sections 10 and 11 of an oscillatory wiper arm, being oscillated in any desirable manner. Enclosed by the sections 10 and 11 in their telescopically interfitted relation to each other is a coiled expansion spring 12 which is directly active upon the outer section 11 of said arm causing it to slidably extend itself with relation to the inner section 10 of the arm. The outer section 11 of this wiper arm has fitted thereto a wiper blade 13, being connected at 14 to said section 11, and this blade at the edge 15 remote from the edge 16 contacting with a glass or panel A has fixed thereto a hanger 17 for a guide roller 18 movable upon a track 19 built in the frame of the windshield B at the lowermost longer side of said windshield.

The connection 14 of the wiper blade 13 with the section 11 of the arm includes a coiled tensioning spring 20 which primarily functions to allow the upper end of the blade 13 to continue its travel after the roller 18 strikes the upright edge of the windshield. This spring also allows the blade 13 when meeting an obstruction to yield and in this way avoiding breakage of the blade or damage thereto. Furthermore, this spring 20 sustains the blade 13 normally in alignment with the sections 10 and 11 with the arm of the wiper.

On the oscillation of the wiper arm, including the sections 10 and 11 thereof and the blade 13, the section 11 being acted upon by the spring 12 is constantly under tension holding the roller 18 at all times in contact with the track 19 and thus the blade will sweep a major area of the glass or panel A having contact with the said blade so as to clean the wiper of rain, sleet, snow or the like for a maximum extent of the area of the glass or pane.

The section 10 has fitted thereto a stop screw 21 playing within an elongated slot 22 in the section 11 and the throw of the section 11 is limited to the extent of said slot 22 by the engagement of the fastener or screw 21 therein.

In Figure 6 of the drawing there is shown diagrammatically the positioning of a pair of spaced wipers constructed in accordance with the invention and the results of operation of this pair upon a windshield glass or pane for the cleaning of the same to a maximum degree or area. The uncleaned area of the glass or pane is at the minimum and is uppermost thereof next to the top edge of the windshield frame.

On oscillation of the windshield wiper arm, the outer section 11 thereof continues to slidably extend itself from within the section 10 and in this fashion giving a broad sweep to the wiper blade 13 during oscillation of the wiper.

What is claimed is:

1. A wiper for a windshield having a frame, comprising a wiper arm mounted for oscillation with relation to said windshield and including telescopic interfitted sections, one slidable relative to the other, means constantly urging the outer section away from the pivot point of the arm, a wiper blade carried by said outer section and extensible therewith, means on the blade having trackage upon said frame remote from the axis of movement of the arm, means carried within the arm for extending the said outer section, and resilient means for the blade normally holding the same aligned with said arm but permitting swinging of the said blade about said trackage means when the latter is restrained from translatory movement.

2. A wiper for a windshield having a frame, comprising a wiper arm mounted for oscillation with relation to said windshield and including telescopic interfitted sections, one slidable relative to the other, means constantly urging the outer section away from the pivot point of the arm, a wiper blade carried by said outer section and extensible therewith, means on the blade having trackage upon said frame remote from the axis of movement of the arm, means carried within the arm for extending the said outer section, resilient means for the blade normally holding the same aligned with said arm but permitting swinging of the said blade about said trackage means when the latter is retrained from translatory movement, and a fixed pivot mounting for said wiper arm.

GUY S. SAWYER.